(12) United States Patent
Jeong et al.

(10) Patent No.: US 6,680,975 B1
(45) Date of Patent: *Jan. 20, 2004

(54) SIGNAL ENCODING AND DECODING SYSTEM AND METHOD

(75) Inventors: Je-Chang Jeong, Seoul (KR); Hen-Hee Mun, Seoul (KR)

(73) Assignee: Samsung Electronics Co., Ltd., Kyonggi-Do (KR)

( * ) Notice: Subject to any disclaimer, the term of this patent is extended or adjusted under 35 U.S.C. 154(b) by 376 days.

This patent is subject to a terminal disclaimer.

(21) Appl. No.: 09/703,649

(22) Filed: Nov. 2, 2000

Related U.S. Application Data (63) Continuation of application No. 08/024,305, filed on Mar. 1, 1993, now Pat. No. 6,263,026.

(30) Foreign Application Priority Data

Feb. 29, 1992 (KR) ............................................. 92-3398

(51) Int. Cl.[7] .................................................. H04N 7/12
(52) U.S. Cl. ................................................. 375/240.23
(58) Field of Search ...................... 375/240.23, 240.24, 375/240.25, 240.26, 240.62, 246, 253; 348/400.1, 423.1; 382/245–246

(56) References Cited

U.S. PATENT DOCUMENTS

| | | | |
|---|---|---|---|
| 4,144,547 A | 3/1979 | Stoffel | 358/133 |
| 4,754,336 A | 6/1988 | Nishizawa | 358/133 |
| 4,821,119 A | 4/1989 | Gharavi | 348/402 |
| 4,985,766 A | 1/1991 | Morrison et al. | 358/136 |
| 5,045,938 A | 9/1991 | Sugiyama | 358/133 |
| 5,057,917 A | 10/1991 | Shalkauser et al. | 358/135 |
| 5,073,820 A | 12/1991 | Nakagawa et al. | 358/133 |
| 5,107,345 A | 4/1992 | Lee | 358/136 |
| 5,136,371 A | 8/1992 | Savatier et al. | 358/135 |
| 5,218,435 A * | 6/1993 | Lim et al. | 375/240.16 |
| 5,227,878 A | 7/1993 | Puri et al. | 348/416 |
| 5,253,055 A * | 10/1993 | Civanlar et al. | 375/240.24 |
| 5,260,781 A * | 11/1993 | Soloff et al. | 375/240.11 |
| 5,276,525 A * | 1/1994 | Gharavi | 382/245 |
| 5,321,776 A * | 6/1994 | Shapiro | 382/240 |
| 5,414,780 A * | 5/1995 | Carnahan | 382/276 |
| 5,757,973 A * | 5/1998 | Wilkinson et al. | 382/246 |

* cited by examiner

*Primary Examiner*—Vu Le
(74) *Attorney, Agent, or Firm*—Sughrue Mion, PLLC (57) ABSTRACT

A multi-scanner scans a signal according to several different patterns. A scanning pattern selector determines which scanning pattern produced the most efficient coding result, for example, for runlength coding, and outputs a coded signal, coded most efficiently, and a selection signal which identifies the scanning pattern found to be most efficient.

93 Claims, 4 Drawing Sheets

SIGNAL ENCODING AND DECODING SYSTEM AND METHOD

This is a Continuation of application Ser. No. 08/024,305 filed Mar. 1, 1993 now U.S. Pat. No. 6,263,026, the disclosure of which is incorporated herein by reference.

FIELD OF THE INVENTION

The present invention relates to a signal compressing system. A system according to the present invention is particularly suited for compressing image signals. The present disclosure is based on the disclosure in Korean Patent Application No. 92-3398 filed Feb. 29, 1992, which disclosure is incorporated herein by reference.

BACKGROUND OF THE INVENTION

Image signals may be compressed by motion-compensated interframe discrete cosine transform (DCT) coding such as is defined by a MPEG (Moving Picture Expert Group) international standard. This form of signal compression has attracted much attention in the field of high definition television (HDTV).

Figure 1:
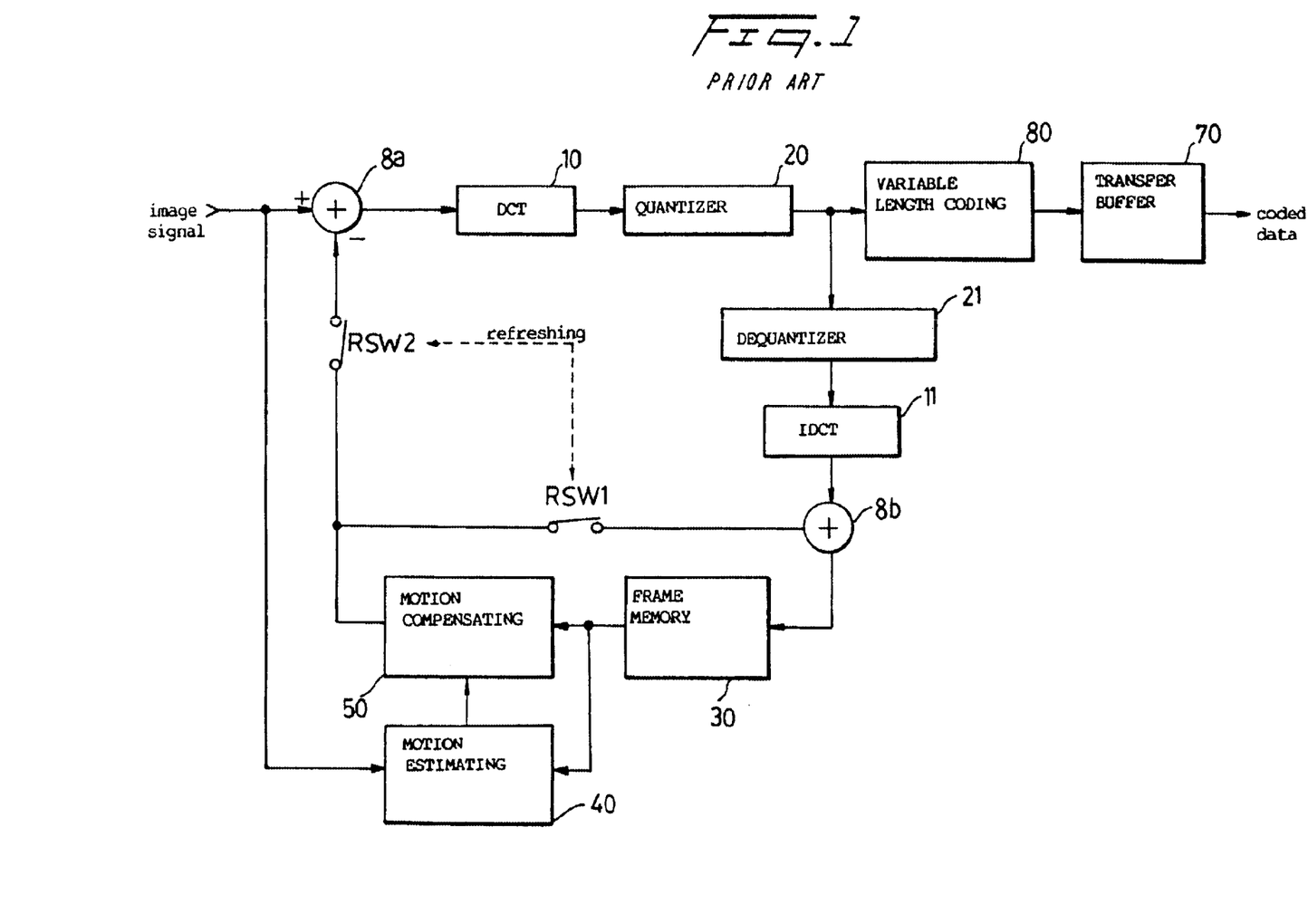
FIG. 1 is a block diagram of a conventional adaptive interframe DCT coding system employing a motion compensating technique.

FIG. 1 is a block diagram of such a conventional motion-compensated interframe DCT coder. In the shown coder, an image signal is divided into a plurality of sub-blocks. The sub-blocks are all of the same size, for example 8×8, 16×16, . . . . A motion estimator 40 produces a motion vector, defined by the difference between the current image signal and a one-frame delayed image signal, output by a frame memory 30. The motion vector is supplied to a motion compensator 50 which compensates the delayed image signal from the frame memory 30 on the basis of the motion vector. A first adder 8a serves to produce the difference between the present frame and the delayed, motion compensated frame. A discrete cosine transform portion 10 processes the difference signal, output by the first adder 8a, for a sub-block. The motion estimator 40 determines the motion vector by using a block matching algorithm.

The discrete cosine transformed signal is quantized by a quantizer 20. The image signal is scanned in a zig-zag manner to produce a runlength coded version thereof. The runlength coded signal comprises a plurality of strings which include a series of "0"s, representing the run length, and an amplitude value of any value except "0".

The runlength coded signal is dequantized by a dequantizer 21, inversely zig-zag scanned and inversely discrete cosine transformed by an inverse discrete cosine transforming portion 11. The transformed image signal is added to the motion-compensated estimate error signal by a second adder 8b. As a result the image signal is decoded into a signal corresponding to the original image signal.

Refresh switches RSW1, RSW2 are arranged between the adders 8a, 8b and the motion compensator 40 so as to provide the original image signal free from externally induced errors.

The runlength coded signal is also supplied to a variable length coder 60 which applies a variable length coding to the runlength coded image signal. The variable length coded signal is then output through a FIFO transfer buffer 70 as a coded image signal.

In motion-compensated adaptive DCT coding, the interframe signal can be easily estimated or coded by way of motion compensation, thereby obtaining a high coding efficiency, since the image signal has a relatively high correlation along the time axis. That is, according to the afore-mentioned method, the coding efficiency is high because most of the energy of a discrete cosine transformed signal is compressed at the lower end of its spectrum, resulting in long runs of "0"s in the runlength coded signal.

However, the scanning regime of the afore-mentioned method does not take account of differences in the spectrum of the motion-compensated interframe DCT signal with time.

A method is known wherein one of a plurality of reference modes is previously selected on the basis of the difference between the present block and that of a previous frame and the image signal is scanned by way of a scanning pattern under the selected mode and suitably quantized. With such a method, however, three modes are employed to compute the energies of the intermediate and high frequency components of the image signal in accordance with the interframe or the intraframe modes in order to determine the appropriate mode. This mode determining procedure is undesirable complicated.

SUMMARY OF THE INVENTION

According to the present invention, there is provided a signal compressing system, comprising coding means for scanning an input signal according to a plurality of different scanning patterns to provided coded versions thereof and selection means for selecting a said scanning pattern which produces efficient coding according to a predetermined criterion and outputting a scanning pattern signal identifying the selected scanning pattern.

Preferably, the input signal is an inherently two-dimensional signal, for example, an image signal.

Preferably, the coding means codes the input signal according to a runlength coding regime.

Preferably, the system includes a variable length coder to variably length code the coded signal, produced by scanning according to the selected scanning pattern.

Preferably, the system includes discrete cosine transformer means to produce said input signal. The transformer means may be a motion-compensated interframe adaptive discrete cosine transformer.

BRIEF DESCRIPTION OF THE DRAWINGS

An embodiment of the present invention will now be described, by way of example, with reference to FIGS. 2 and 3 of the accompanying drawings, in which.

DETAILED DESCRIPTION OF THE PREFERRED EMBODIMENTS

Figure 2:
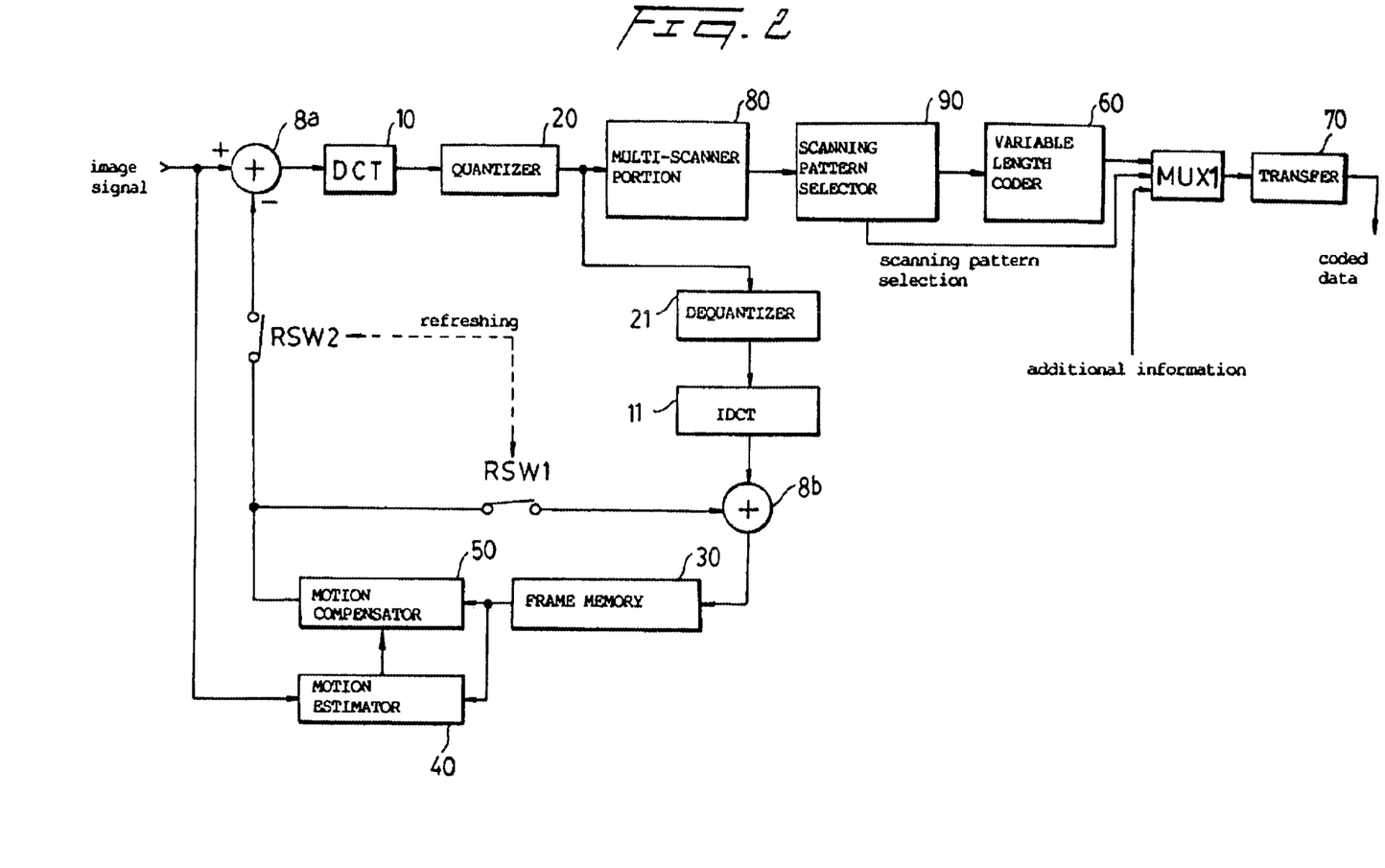
FIG. 2 is a block diagram of a coding system embodying the present invention.
Figure 3A:
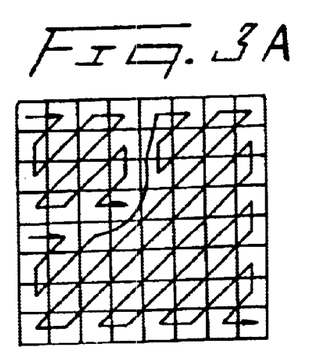
FIGS. 3A–3H show various possible scanning patterns according to the present invention.
Figure 3B:
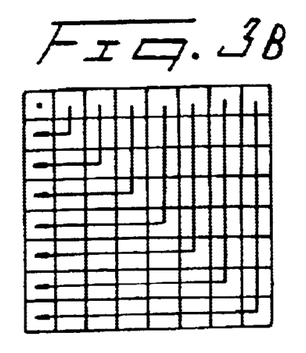
Figure 3C:
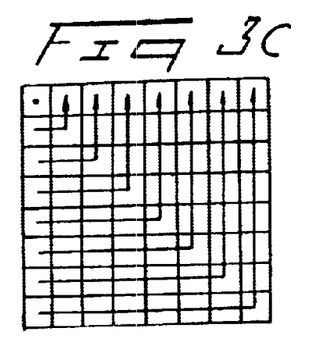
Figure 3D:
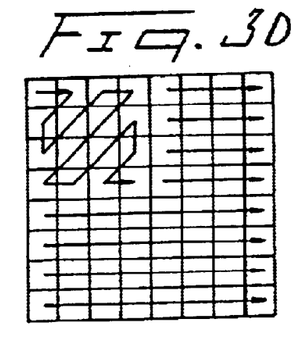
Figure 3E:
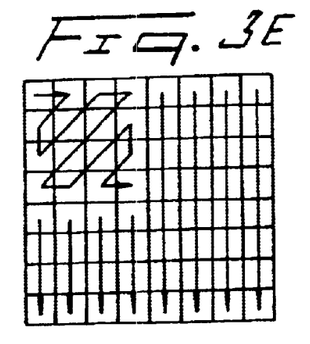
Figure 3F:
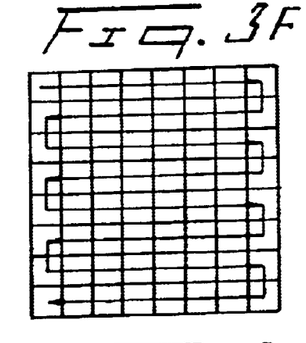
Figure 3G:
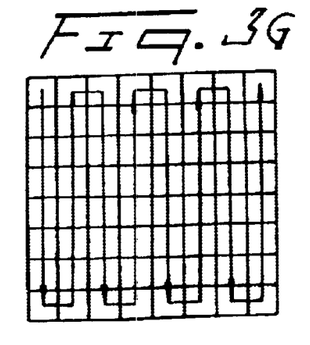
Figure 3H:
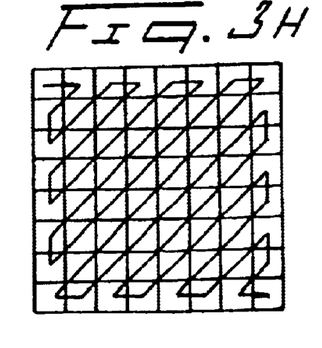

Referring to FIG. 2, an input signal is divided into equal-sized sub-blocks, for example, 8×8, 16×16, . . . . A motion estimator 40 determines a motion vector by comparing the current frame and a one frame delayed signal from a frame memory 30.

The motion vector is supplied to a motion compensator 60 which, in turn, compensates the delayed frame signal for movement. A first adder 8a produces a difference signal representing the difference between the present frame and the delayed, motion-compensated frame. A DCT coder 10 DCT-codes the difference signal. The DCT coded image signal is quantized by a quantizer 20 and then dequantized by a dequantizer 21. The dequantized signal is supplied to a second adder 8b, via IDCT 11, which adds it to the output of the motion compensator 11. This produces a signal corresponding to the original image signal.

The output of the motion compensator 50 is applied to the adders 8a, 8b by refresh switches RSW2 and RSW1, respectively.

The quantized image signal is also supplied to a multi-scanner 80 which scans it according to a plurality of predetermined patterns.

A scanner pattern selector 90 selects the scanning pattern which produces the minimum number of bits to represent the current sub-block. The scanning pattern selector also produces selection data which identifies the selected scanning pattern.

The image signal output by the scanning pattern selector 90 is variable length coded by a variable length coder 60. The variable length coder 60 compresses the image signal output by the scanning pattern selector 90. The variable length coder 60 operates such that a large proportion of the data samples are each represented by a small number of bits while a small proportion of the data samples are each represented by a large number of bits.

When a discrete cosine transformed image signal is quantized and runlength coded, the number of "0"s is increased over all, while the number of "0"s decreases as the magnitude of the signal increases. Accordingly, data compression is achieved because "0"can be represented by only a few bits and "255" can be represented by a relatively large number of bits.

Both the variable length coded signal and the selection data are supplied to a multiplexer MUX1 which multiplexes the variable length coded signal and the selection data, and optionally additional information such as teletext.

Since the variable length coded signal has data words of different lengths, a transfer buffer 70 is employed to temporarily store the multiplexed signal and output it at a constant rate.

The original image signal is reconstructed at a remote station by performing the appropriate inverse scanning of the runlength coded signal in accordance with the multiplexed scanning pattern selection data.

Figure 4:
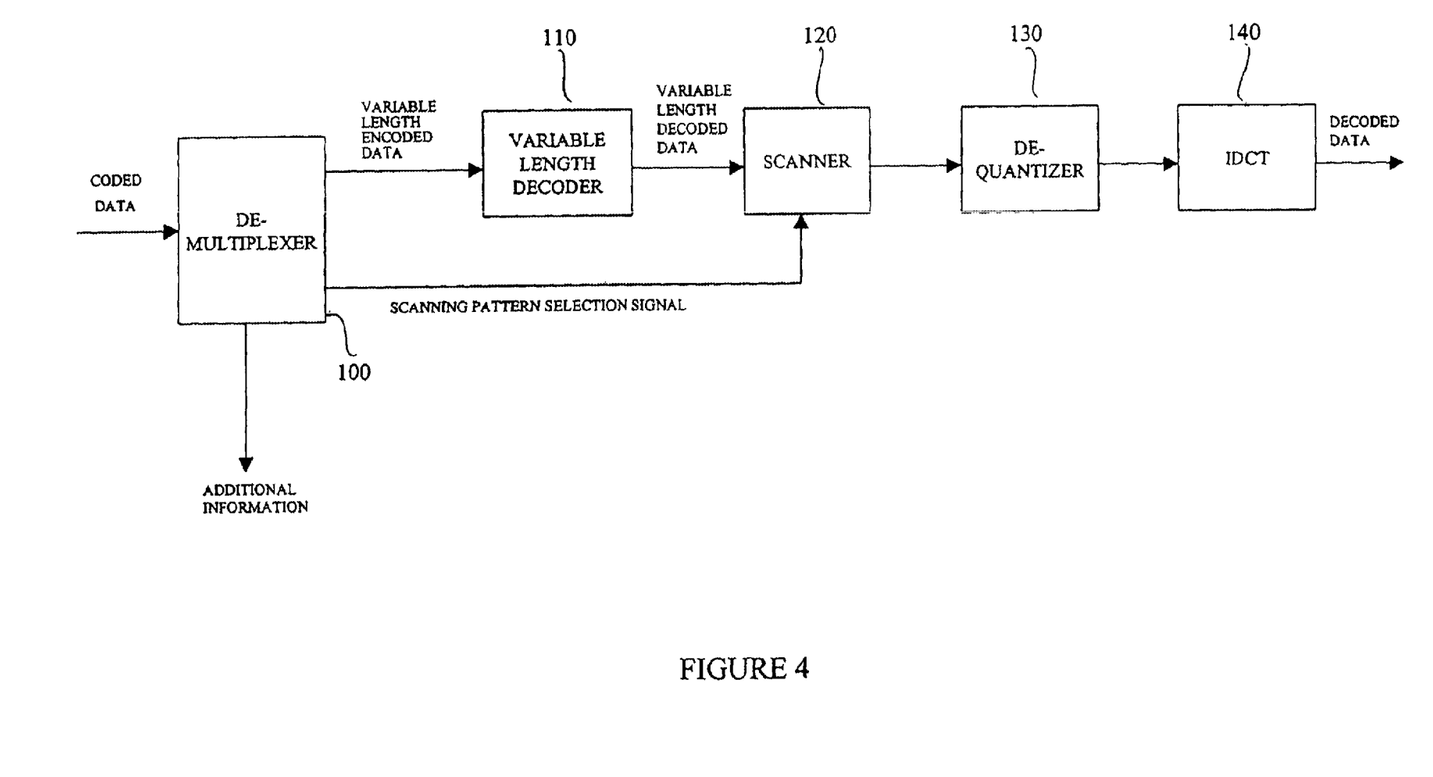
FIG. 4 is a block diagram of a decoding system according to the present invention.

FIG. 4 shows a decoding system at a remote station that receives and extracts the encoded data. In FIG. 4, demultiplexer 100 receives coded data and, in an operation inverse to that performed at the coding system, extracts the variable length encoded data, the scanning pattern information and the additional information that had been multiplexed together at the coding system. Variable length decoder 110 variable length decodes the variable length encoded data, and scanner 120 receives the variable length decoded data and reconstructs the original sub-block using a scanning pattern indicated by the extracted scanning pattern selection signal. The scanner would necessarily have to select one from a plurality pattern that was available for encoding. Using components having the same margin as dequantizers 21 and 1 DCT 11 in the encoder system, dequantizer 120 dequantizes the signal output from the scanner 120, and inverse discrete cosine transformer 140 performs an inverse discrete cosine transform function on the output of dequantizer 130, to output decoded data.

FIGS. 3A to 3H show possible scanning patterns employed by the multi-scanner 80. Additional scanning patterns will be apparent to those skilled in the art. However, if the number of patterns becomes too large, the coding efficiency is degraded as the selection data word becomes longer.

As described above, according to the present invention, the quantized image signal is scanned according to various scanning patterns, and then the most efficient pattern is selected. A suitable measure of efficiency is the number of bits required to runlength code the image signal.

What is claimed is:

1. A video signal compression system, comprising:
   a scanner which is operative to simultaneously scan a set of video spatial frequency coefficients of an individual sub-block according to a plurality of different scanning patterns to produce a plurality of sets of reordered coefficients;
   a scanning pattern selector operative to select from the plurality of sets of reordered coefficients a set of reordered coefficients which produces the most efficient coding according to a predetermined criterion and to produce a pattern signal indicating the scanning pattern corresponding to the selected set of reordered coefficients; and
   an entropy coder operative to entropy encode the selected set of reordered coefficients and output an entropy encoded signal.

2. The video signal compression system according to claim 1, further comprising a combining unit which combines into one signal the pattern signal produced by said scanning pattern selector and the entropy encoded signal.

3. The video signal compression system according to claim 2 wherein said combining unit is a multiplexer.

4. The video signal compression system according to claim 3, wherein said multiplexer receives additional information and multiplexes the additional information, the pattern signal and the entropy encoded signal.

5. The video signal compression system according to claim 4, wherein the additional information is teletext information.

6. The video signal compression system according to claim 1, wherein said scanner produces the plurality of sets of reordered coefficients according to a runlength coding regime.

7. The video signal compression system according to claim 1, further comprising a discrete cosine transformer for use in generating the set of video spatial frequency coefficients.

8. The video signal compression system according to claim 1, wherein said entropy encoder is a variable length coder.

9. A video signal compression system, comprising:
   means for simultaneously scanning a set of video spatial frequency coefficients of an individual sub-block according to a plurality of different scanning patterns to produce a plurality of sets of reordered coefficients;
   means for selecting a scanning pattern from the plurality of sets of reordered coefficients which produces a set of reordered coefficients having the most efficient coding according to a predetermined criterion and for outputting a pattern signal indicating the scanning pattern corresponding to the selected set of reordered coefficients; and
   means for entropy encoding the selected set of reordered coefficients and for outputting an entropy encoded signal.

10. The video signal compression system according to claim 9, further comprising means for combining the pattern signal produced by said scanning pattern selector and the entropy encoded signal.

11. The video signal compression system according to claim 10, wherein said means for combining is a multiplexer.

12. The video signal compression system according to claim 11, wherein said multiplexer receives additional information and multiplexes the additional information, the pattern signal and the entropy encoded signal.

13. The video signal compression system according to claim 12, wherein the additional information is teletext information.

14. The video signal compression system according to claim 9, wherein said means for scanning produces the plurality of sets of reordered coefficients according to a runlength coding regime.

15. The video signal compression system according to claim 9, further comprising discrete cosine transformer means for use in generating the set of video spatial frequency coefficients.

16. The video signal compression system according to claim 9, wherein said means for entropy encoding is a variable length coder.

17. A decoder for decompressing a compressed video signal, the compressed video signal containing entropy encoded data representing a set of video spatial frequency coefficients of an individual sub-block which have been scanned using a selected one of a plurality of different scanning patterns to produce a set of reordered coefficients, and also containing a pattern signal indicating the selected one of the plurality of different scanning patterns, wherein the selected scanning pattern produces the most efficient coding according to a predetermined criterion, the decoder comprising:
   an entropy decoder operative to decode the entropy encoded data and to output entropy decoded data; and
   a scanner operative to scan the entropy decoded data according to the one selected pattern of the plurality of different scanning patterns as indicated by the pattern signal.

18. A decoder for decoding a coded data signal containing a compressed video signal and a pattern signal, the decoder comprising:
   an entropy decoder to which is applied the compressed video signal, the compressed video signal including entropy encoded data representing a set of video spatial frequency coefficients of an individual sub-block which have been scanned using a specific pattern selected from a plurality of different scanning patterns to produce a set of reordered coefficients, wherein the specific scanning pattern produces the most efficient coding according to a predetermined criterion, said entropy decoder being operative to entropy decode the entropy encoded data and to output entropy decoded data; and
   a scanner operative to scan the entropy decoded data responsive to the pattern signal, and to output scanned data, wherein the pattern signal indicates the specific scanning pattern.

19. The decoder according to claim 18 wherein the coded data signal further includes additional information.

20. The decoder according to claim 19, wherein the entropy encoded data, the pattern signal and the additional information are multiplexed together as part of the coded data signal, and wherein said decoder further includes a demultiplexer which demultiplexes the entropy encoded data, the pattern signal and the additional information.

21. The decoder according to claim 18 wherein the entropy encoded data and the pattern signal are multiplexed together as part of the coded data signal.

22. The decoder according to claim 18, wherein the entropy encoded data is encoded according to a variable length encoding regime.

23. The decoder according to claim 18, wherein the scanner scans the entropy decoded data according to a runlength decoding regime.

24. The decoder of claim 18, further comprising a dequantizer which dequantizes the scanned data output by said scanner and outputs dequantized data.

25. The decoder of claim 24, further comprising an inverse discrete cosine transformer which inverse discrete cosine transforms the dequantized data output by said dequantizer.

26. A decoder, comprising:
   decoding means to which is applied a coded data signal including a compressed video signal, the compressed video signal including entropy encoded data representing a set of video spatial frequency coefficients of an individual sub-block which have been scanned using a selected one of a plurality of different scanning patterns to produce a set of reordered coefficients and, the coded data signal also including a pattern signal indicating the selected one of the plurality of different scanning patterns, wherein the selected scanning pattern produces the most efficient coding according to a predetermined criterion, said decoding means for entropy decoding the entropy encoded data and for outputting entropy decoded data; and
   scanning means for scanning the entropy decoded data according to the selected pattern indicated by the pattern signal.

27. The decoder according to claim 26, wherein the coded data signal further includes additional information.

28. The decoder according to claim 26, wherein the entropy encoded data and the pattern signal are multiplexed together as part of the coded data signal, and wherein said decoder further includes a demultiplexing means for demultiplexing the entropy encoded data, the pattern signal and the additional information.

29. The decoder according to claim 26, wherein the entropy encoded data is encoded according to a variable length encoding regime.

30. The decoder according to claim 26, wherein the scanning means scans the entropy decoded data according to a runlength decoding regime.

31. The decoder according to claim 26, further comprising dequantizing means for dequantizing the scanned data output by said scanning means and for outputting dequantized data.

32. The decoder according to claim 31, further comprising inverse discrete cosine transformer means for inverse discrete cosine transforming the dequantized data output by said dequantizing means.

33. A decoding apparatus for decoding a coded data signal which includes entropy encoded data representing a set of video spatial frequency coefficients of an individual sub-block, the set of video spatial frequency coefficients having been reordered from an original order according to a scanning pattern selected from a plurality of scanning patterns, the coded data signal also including a pattern signal indicating the selected scanning pattern, the decoding apparatus comprising:
   an entropy decoder which entropy decodes the entropy encoded data to produce entropy decoded data; and a scanning unit which receives the entropy decoded data and returns the set of video spatial frequency coefficients of an individual sub-block to the original order according to the selected scanning pattern indicated in the pattern signal.

34. The decoding apparatus according to claim 33, wherein the coded data signal further includes additional information.

35. The decoding apparatus according to claim 34, wherein the entropy encoded data, the pattern signal and the additional information are multiplexed together as part of the coded data signal and wherein said decoding apparatus further includes a demultiplexer which demultiplexes the entropy encoded data, the pattern signal and the additional information.

36. The decoding apparatus according to claim 33, wherein the entropy encoded data and the pattern signal are multiplexed together as part of the coded data signal.

37. The decoding apparatus according to claim 33, wherein the entropy encoded data is encoded according to a variable length encoding regime.

38. The decoding apparatus according to claim 33, wherein the scanning unit scans the entropy decoded data according to a runlength decoding regime.

39. The decoding apparatus of claim 3, further comprising a dequantizer which dequantizes the scanned data output by said scanning unit and outputs dequantized data.

40. The decoding apparatus of claim 39, further comprising an inverse discrete cosine transformer which inverse discrete cosine transforms the dequantized data output by said dequantizer.

41. A method of compressing a video signal, comprising:
   simultaneously scanning a set of video spatial frequency coefficients of an individual sub-block according to a plurality of different scanning patterns to produce a plurality of sets of reordered coefficients;
   selecting a scanning pattern from the plurality of sets of reordered coefficients which produces a set of reordered coefficients having the most efficient coding according to a predetermined criterion and outputting a pattern signal indicating the scanning pattern corresponding to the selected set of reordered coefficients; and
   entropy encoding the selected set of reordered coefficients and outputting an entropy encoded signal.

42. The method of claim 41, further comprising a step of multiplexing the pattern signal produced by said scanning pattern selector and the entropy encoded signal.

43. The method of claim 42, wherein said multiplexing step further includes receiving additional information and multiplexing the additional information, the pattern signal and the entropy encoded signal.

44. The method of claim 43, wherein the additional information is teletext information.

45. The method of claim 41, wherein said scanning step produces the plurality of sets of reordered coefficients according to a runlength coding regime.

46. The method of claim 41, wherein the set of video spatial frequency coefficients is generated using a discrete cosine transformer.

47. The method of claim 41, wherein said entropy encoding is variable length coding.

48. A method of decoding a compressed video signal, comprising:
   receiving a coded data signal, the coded data signal including a compressed video signal having entropy encoded data representing a set of video spatial frequency coefficients of an individual sub-block which have been scanned using a selected one of a plurality of different scanning patterns to produce a set of reordered coefficients, the coded data signal also including a pattern signal indicating the selected one of the plurality of different scanning patterns, wherein the selected scanning pattern produces the most efficient coding according to a predetermined criterion;
   entropy decoding the entropy encoded data and outputting entropy decoded data; and
   scanning the entropy decoded data according to the selected pattern indicated by the pattern signal and outputting scanned data.

49. The method of claim 48, wherein the coded data signal further includes additional information.

50. The method of claim 49, wherein the entropy encoded data, the pattern signal and the additional information are multiplexed together as part of the coded data signal and wherein said decoding step further includes demultiplexing the entropy encoded data, the pattern signal and the additional information.

51. The method of claim 48, wherein the entropy encoded data and the pattern signal are multiplexed together as part of the coded data signal.

52. The method of claim 48, wherein the entropy encoded data is encoded according to a variable length encoding regime.

53. The method of claim 48, wherein the scanning step comprises scanning the entropy decoded data according to a runlenth decoding regime.

54. The method of claim 48, further comprising a step of dequantizing the scanned data output by said scanning step and outputting dequantized data.

55. The method of claim 54, further comprising a step of inverse discrete cosine transforming the dequantized data output by said dequantizing step.

56. A method of decoding a coded data signal which includes entropy encoded data representing a set of video spatial frequency coefficients of an individual sub-block, the set of video spatial frequency coefficients having been reordered from an original order according to a scanning pattern selected from a plurality of scanning patterns, the coded data signal also including a pattern signal indicating the selected scanning pattern, the method comprising:
   entropy decoding the entropy encoded data to produce entropy decoded data; and
   scanning the entropy decoded data and returning the set of video spatial frequency coefficients of an individual sub-block to the original order according to the selected scanning pattern indicated in the pattern signal.

57. The method of claim 56, wherein the coded data signal further includes additional information.

58. The method of claim 57, wherein the entropy encoded data, the pattern signal and the additional information are multiplexed together as part of the coded data signal and wherein the method further comprises demultiplexing the entropy encoded data, the pattern signal and the additional information.

59. The method of claim 56, wherein the entropy encoded data and the pattern signal are multiplexed together as part of the coded data signal.

60. The method of claim 56, wherein the entropy encoded data is encoded according to a variable length encoding regime.

61. The method of claim 56, wherein in said scanning step the entropy decoded data is scanned according to a runlength decoding regime.

62. The method of claim 56, further comprising a step of dequantizing the scanned data output by said scanning step and outputting dequantized data.

63. The method of claim 62, further comprising a step of inverse discrete cosine transforming the dequantized data output by said dequantizing step.

64. A video signal compression system, comprising:
- a multi-scanner which is operative to simultaneously scan a set of video spatial frequency coefficients of an individual sub-block according to a plurality of different scanning patterns to produce a plurality of sets of reordered coefficients;
- a scanning pattern selector operative to select from the plurality of sets of reordered coefficients a set of reordered coefficients which produces the most efficient coding according to a predetermined criterion and to produce a pattern signal indicating the scanning pattern corresponding to the selected set of reordered coefficients;
- an entropy coder operative to entropy encode the selected set of reordered coefficients and to output entropy encoded data;
- an entropy decoder operative to decode the entropy encoded data and to output entropy decoded data; and
- a scanner which is operative to scan the entropy decoded data according to the scanning pattern corresponding to the selected set of reordered coefficients as indicated by the pattern signal and to output scanned data.

65. The video signal compression system according to claim 64, further comprising:
- a combiner which combines additional information with the entropy encoded data and the pattern signal to produce a combined signal; and
- a unit which receives the combined signal, extracts the additional information therefrom, and transmits the entropy encoded data to said entropy decoder and the pattern signal to said scanner.

66. The video signal compression system according to claim 65, wherein said combiner is a multiplexer and said unit which receives the combined signal is a demultiplexer.

67. The video signal compression system according to claim 65, wherein the additional information is teletext information.

68. The video signal compression system according to claim 64, wherein said multi-scanner produces the plurality of sets of reordered coefficients according to a runlength coding regime.

69. The video signal compression system according to claim 64, further comprising a discrete cosine transformer for use in generating the set of video spatial frequency coefficients.

70. The video signal compression system according to claim 64, wherein said entropy encoder is a variable length coder.

71. The video signal compression system according to claim 64, wherein the scanner scans the entropy decoded data according to a runlength decoding regime.

72. The video signal compression system according to claim 64, further comprising a dequantizer which dequantizes the scanned data output by said scanner and outputs dequantized data.

73. The video signal compression method according to claim 72, further comprising an inverse discrete cosine transformer which inverse discrete cosine transforms the dequantized data output by said dequantizer.

74. A video signal compression system, comprising:
- multi-scanning means for simultaneously scanning a set of video spatial frequency coefficients of an individual sub-block according to a plurality of different scanning patterns to produce a plurality of sets of reordered coefficients;
- scanning pattern selecting means for selecting from the plurality of sets of reordered coefficients a set of reordered coefficients which produces the most efficient coding according to a predetermined criterion and for producing a pattern signal indicating the scanning pattern corresponding to the selected set of reordered coefficients;
- entropy coding means for entropy encoding the selected set of reordered coefficients and outputting entropy encoded data;
- entropy decoding means for decoding the entropy encoded data and outputting entropy decoded data; and
- scanning means for scanning the entropy decoded data according to the scanning pattern corresponding to the selected set of reordered coefficients as indicated by the pattern signal and outputing scanned data.

75. The video signal compression system according to claim 74, further comprising:
- combining means for combining additional information with the entropy encoded data and the pattern signal to produce a combined signal; and
- de-coupling means for receiving the combined signal, extracting the additional information therefrom, and transmitting the entropy encoded data to said entropy decoding means and the pattern signal to said scanning means.

76. The video signal compression system according to claim 75, wherein said combining means is a multiplexer and said de-coupling means is a demultiplexer.

77. The video signal compression system according to claim 75, wherein the additional information is teletext information.

78. The video signal compression system according to claim 74, wherein said multi-scanning means produces the plurality of sets of reordered coefficients according to a runlength coding regime.

79. The video signal compression system according to claim 74, further comprising a discrete cosine transforming means for use in generating the set of video spatial frequency coefficients.

80. The video signal compression system according to claim 74, wherein said entropy encoding means is a variable length coder.

81. The video signal compression system according to claim 74, wherein said scanning means scans the entropy decoded data according to a runlength decoding regime.

82. The video signal compression system according to claim 74, further comprising dequantizing means for dequantizing the scanned data output by said scanning means and outputting dequantized data.

83. The video signal compression system according to claim 81, further comprising inverse discrete cosine transforming means for inverse discrete cosine transforming the dequantized data output by said dequantizing means.

84. A video signal compression method, comprising:
- simultaneously scanning a set of video spatial frequency coefficients of an individual sub-block according to a plurality of different scanning patterns to produce a plurality of sets of reordered coefficients;
- selecting from the plurality of sets of reordered coefficients a set of reordered coefficients which produces the most efficient coding according to a predetermined criterion and producing a pattern signal indicating the scanning pattern corresponding to the selected set of reordered coefficients;

entropy encoding the selected set of reordered coefficients and outputting entropy encoded data;

decoding the entropy encoded data and outputting entropy decoded data; and scanning the entropy decoded data according to the scanning pattern corresponding to the selected set of reordered coefficients as indicated by the pattern signal and outputting scanned data.

85. The video signal compression method according to claim 83, further comprising steps of:

combining additional information with the entropy encoded data and the pattern signal to produce a combined signal; and receiving the combined signal and extracting the additional information therefrom, the entropy encoded data therefrom for use in the decoding step, and the pattern signal therefrom for use in the step of scanning the entropy decoded data.

86. The video signal compression method according to claim 85, wherein said combining step multiplexes the additional information with the entropy encoded data and the pattern signal to produce the combined signal and said extracting step de-multiplexes the additional information, the entropy encoded data, and the pattern signal.

87. The video signal compression method according to claim 85, wherein the additional information is teletext information.

88. The video signal compression method according to claim 84, wherein said step of scanning the set of video spatial frequency coefficients produces the plurality of sets of reordered coefficients according to a runlength coding regime.

89. The video signal compression method according to claim 84, further comprising a step of generating the set of video spatial frequency coefficients by discrete cosine transformation.

90. The video signal compression method according to claim 84, wherein said entropy encoding is variable length coding.

91. The video signal compression method according to claim 84, wherein in said step of scanning the entropy decoded data, the entropy decoded data are scanned according to a runlength decoding regime.

92. The video signal compression method according to claim 84, further comprising dequantizing the scanned data, output in said step of scanning the entropy decoded data, and outputting dequantized data.

93. The video signal compression method according to claim 92, further comprising inverse discrete cosine transforming the dequantized data.

* * * * *